United States Patent [19]

Tallerico

[11] Patent Number: 5,327,670
[45] Date of Patent: Jul. 12, 1994

[54] TROLLING LURE

[76] Inventor: Roy D. Tallerico, 730 North, 400 East, Price, Utah 84501

[21] Appl. No.: 70,976

[22] Filed: Jun. 4, 1993

[51] Int. Cl.⁵ ............................................. A01K 85/00
[52] U.S. Cl. .................................. 43/42.14; 43/42.19; 43/42.06; 43/42.34
[58] Field of Search ................. 43/42.06, 42.14, 42.19, 43/42.11, 42.12, 42.15, 42.16, 42.17, 42.18, 42.34, 42.5

[56] References Cited

U.S. PATENT DOCUMENTS

| | | | |
|---|---|---|---|
| 341,954 | 5/1886 | Skinner | 43/42.34 |
| 853,972 | 5/1907 | Grout | 43/42.34 |
| 1,292,865 | 1/1919 | Olt | 43/42.14 |
| 1,627,637 | 5/1927 | Dahlquist | 43/42.34 |
| 2,911,753 | 11/1959 | Beckett | 43/42.14 |
| 3,095,664 | 7/1963 | Nichols . | |
| 3,118,244 | 1/1964 | Coburn . | |
| 3,604,140 | 9/1971 | Nelson . | |
| 3,775,892 | 12/1973 | Bennetts | 43/42.14 |
| 3,805,437 | 4/1974 | Harris . | |
| 4,133,134 | 1/1979 | Cheng | 43/42.06 |
| 4,640,041 | 2/1987 | Stanley | 43/42.14 |
| 4,679,347 | 7/1987 | Stirtz . | |
| 4,794,721 | 1/1989 | Rowe . | |
| 4,927,643 | 5/1990 | D'Orazio | 43/42.06 |
| 5,113,606 | 5/1992 | Rinker . | |
| 5,245,781 | 9/1993 | Helmuth | 43/42.19 |

FOREIGN PATENT DOCUMENTS

| | | | |
|---|---|---|---|
| 167809 | 9/1950 | Canada . | |
| 0467809 | 9/1950 | Canada | 43/42.19 |
| 722875 | 12/1965 | Canada . | |

Primary Examiner—P. Austin Bradley
Assistant Examiner—James Miner
Attorney, Agent, or Firm—Richard C. Litman

[57] ABSTRACT

A trolling lure includes multiple spoons or spinners attached in series along a flexible cable leader. The spoons or spinners may be of the same size or of different sizes, and the leader also includes several series of plastic or glass beads along the leader to provide color. Some of the beads may also serve as bearings for the rotational action of the spoons or spinners. Spacing of the spoons or spinners, beads, and other components is achieved by crimping or swaging sleeves onto the multiple strand cable leader at various points. The spoons or spinners are preferably of aluminum, to provide relatively light weight for slower trolling speeds, and are preferably provided with a somewhat porous surface by weathering, knurling, or abrading the surface. The porosity thus achieved provides a more realistic and less reflective surface, and further provides better retention of a fish attracting scent thereon.

16 Claims, 1 Drawing Sheet

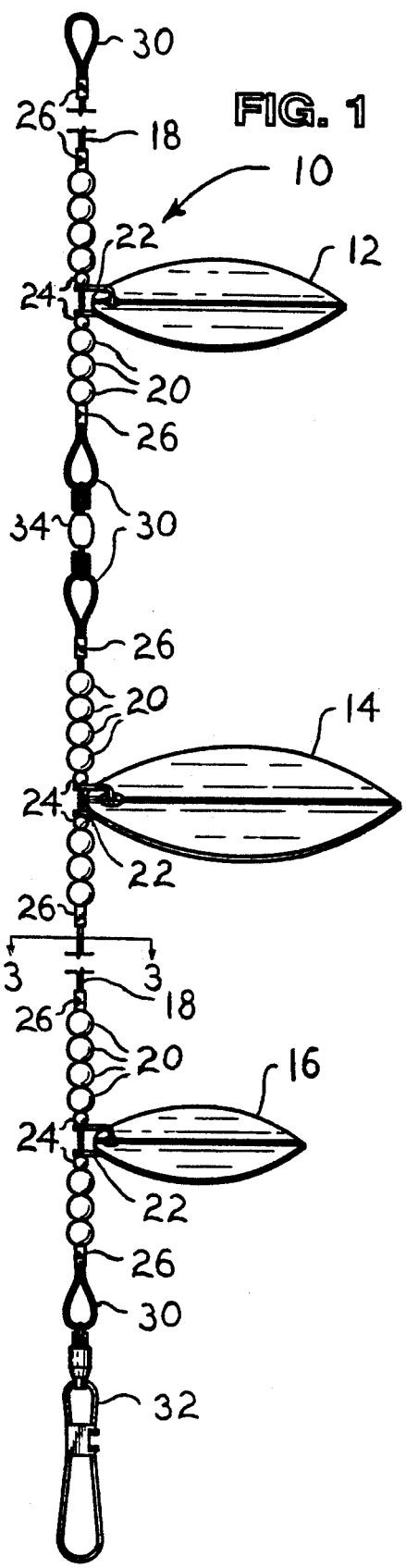
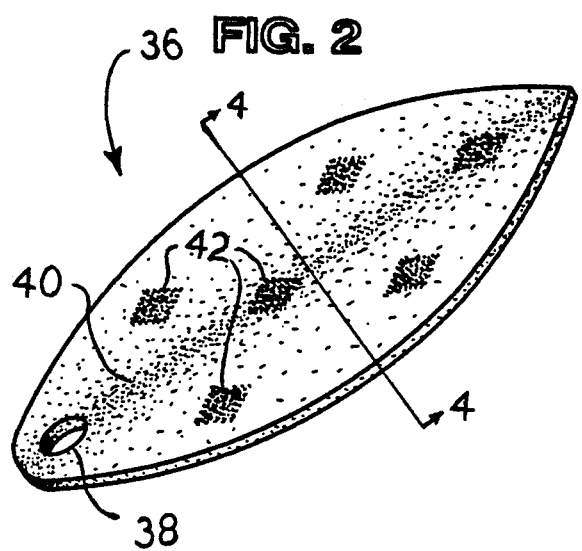
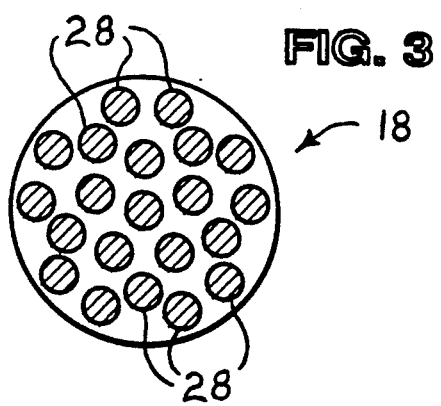
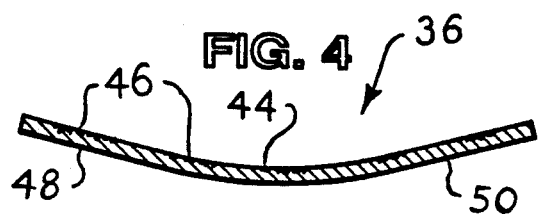

TROLLING LURE

FIELD OF THE INVENTION

The present invention relates generally to fishing tackle and equipment, and more specifically to a trolling lure having a plurality of curved blades in series on a flexible leader, with the blades providing for retention of a fish attracting scent and further providing for rotation about the flexible leader.

BACKGROUND OF THE INVENTION

It is well known that predatory fish are attracted by the sight of other smaller fish, particularly when swimming as a group or school. Generally, fish are provided with a darker upper surface and a lighter lower surface for camouflage purposes, and the lighter shaded lower surface will often catch the light as the fish swims and turns. Accordingly, spinning lures or spoons have been developed which mimic this appearance to a certain extent.

However, fish are generally not highly reflective, travel in groups or schools of at least a few fish, and emit a scent which may be attractive to larger predatory fish. For the most part, spinning lures developed heretofore have been provided with relatively highly reflective surfaces, in some cases even mirror-like, which does little to deceive predatory fish. Moreover, predatory fish are more likely to be attracted to a group or school of smaller fish, wherein it will prove more likely that they will be able to catch such smaller fish more easily. Most present lures are equipped with but a single spinner or spoon, which is incapable of simulating a group or school of small fish. Finally, lures which are equipped with means to emit a fish attractive scent, must do so by attaching a separate article to the lure or lead, other than the spinner or spoon itself, which practice detracts from the realism of the lure.

What is needed is a lure comprising a series of spinner or spoon type blades, which blades are relatively dull in appearance to more closely simulate the appearance of a school of swimming fish. The spoons or blades must be provided with means to contain a fish attracting scent directly on the blades themselves, rather than requiring a separate scent emitting device on the leader. Finally, the leader itself must provide sufficient flex so as to allow the plural blades to be disposed in other than a straight line as they spin and move due to their motion through the water, thereby to simulate the actions of a school of fish even more closely.

DESCRIPTION OF THE PRIOR ART

U.S. Pat. No. 3,095,664 issued to William O. Nichols on Jul. 2, 1963 discloses a Trolling Spinner in which the clevis(es) and spacer(s) along the leader are formed as coil springs. No flexible, multiple strand cable leader is disclosed, nor is any scent attractant or lure having low reflectiveness.

U.S. Pat. No. 3,118,244 issued to Donald R. Coburn on Jan. 21, 1964 discloses a Fishing Lure comprising a plurality of twisted reflective spinners symmetrically disposed to either side of a leader. The leader must be relatively stiff in order to preclude any asymmetric forces from causing one of the spinners to contact the leader, unlike the present invention. Moreover, the lure and spinners fail to provide anymeans for dispensing scent attractant.

U.S. Pat. No. 3,604,140 issued to Dudley W. Nelson on Sep. 14, 1971 discloses a Fish Lure comprising plural flasher blades rotatably attached to a shaft. The same limitations apply here as to the devices discussed above.

U.S. Pat. No. 3,805,437 issued to Ewell J. Harris on Apr. 23, 1974 discloses a Trolling Or Casting Lure having two laterally separated reflective lures secured to lengths of stiff wire. No fish attracting scent is disclosed.

U.S. Pat. No. 4,679,347 issued to Ronald H. Stirtz on Jul. 14, 1987 discloses a Fishing Flasher comprising plural flexible blades disposed serially along a flexible line. The blades are installed symmetrically with their centers along the line, and are highly reflective, unlike the present invention.

U.S. Pat. No. 4,794,721 issued to Robert R. Rowe, Jr. et al. on Jan. 3, 1989 discloses a Fishing Lure Attachment having a plurality of serially spaced apart reflective spinners along a flexible line, with two symmetrically spaced apart spinners at the front end of the line. While the flexible nature of the leader provides some realism, the highly reflective spinners are unlike the present invention, and moreover no means for dispensing any fish attracting scent is disclosed.

U.S. Pat. No. 5,113,606 issued to David E. Rinker on May 19, 1992 discloses a Scented Lure in which the scent is located in the recesses of one or more swivel bearings along the leader, or within a sleeve along the leader. No means is disclosed for placing the scent attractant directly upon the spoon or spinner, nor the use of a relatively dull finish on the spoon or spinner.

Canadian Patent No. 167,809 issued to Frederic Desrosiers on Sep. 5, 1950 discloses Trolling Devices having spoons or spinners with compound curves. The leader is a hard, inflexible wire, and no means is disclosed for the dispensing of a fish attracting scent.

Finally, Canadian Patent No. 722,875 issued to William O. Wesseler on Dec. 7, 1965 discloses Fishing Tackle Attractant having various shapes of highly reflective spinners or spoons. No fish attracting scent is disclosed.

None of the above noted patents, taken either singly or in combination, are seen to disclose the specific arrangement of concepts disclosed by the present invention.

SUMMARY OF THE INVENTION

By the present invention, an improved trolling lure is disclosed.

Accordingly, one of the objects of the present invention is to provide an improved trolling lure which includes at least one spinner or spoon thereon, with the spinner or spoon provided with a relatively dull, semireflective finish.

Another of the objects of the present invention is to provide an improved trolling lure in which the semireflective finish of the spoons or spinners is provided by means of surface microporosity or scratches, which microporosity provides for the retention of a fish attracting scent.

Yet another of the objects of the present invention is to provide an improved trolling lure in which the semireflective finish of the spoons or spinners is provided by means of a knurled finish on at least a portion of the spoon or spinner surface, which knurling also provides for the retention of a fish attracting scent.

Still another of the objects of the present invention is to provide an improved trolling lure which may include plural spoons or spinners having different sizes.

A further object of the present invention is to provide an improved trolling lure which uses a multiple strand, flexible cable as a leader.

An additional object of the present invention is to provide an improved trolling lure which provides for spacing between spoons or spinners installed along the leader, by means of swaged spacers therealong.

Another object of the present invention is to provide an improved trolling lure in which the spoons or spinners are formed having a shallow V section, including two planar elements with a shallow curvature therebetween.

Yet another object of the present invention is to provide an improved trolling lure which includes a plurality of serially disposed and colored beads along the leader, providing additional visual attraction.

Still another object of the present invention is to provide an improved trolling lure in which at least some of the beads disposed along the leader also serve as axial bearings for the spoons or spinners installed therealong.

A final object of the present invention is to provide an improved trolling lure for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 1 is a plan view of the trolling lure and leader of the present invention with the length shown shortened for greater clarity, providing an exemplary showing of one arrangement of the present invention.

FIG. 2 is a perspective view of one of the spoons or spinners of the lure of the present invention, showing its features.

FIG. 3 is a greatly enlarged cross sectional view through section 3—3 of FIG. 1, showing the multiple strand nature of the cable leader.

FIG. 4 is a cross sectional view through section 4—4 of FIG. 2, showing the non-planar shape of the spoons or spinners of the present invention.

Similar reference characters denote corresponding features consistently throughout the several figures of the attached drawings.

DETAILED DESCRIPTION OF THE PREFERRED EMBODIMENT

Referring now particularly to FIG. 1 of the drawings, the present invention will be seen to relate to a trolling lure 10 having one or more spoons or spinners 12, 14, and 16 installed upon a flexible cable leader 18. A series of beads 20, which may be plastic or glass and may be variously colored and/or reflective, is also strung along the length of the leader 18, at various points. The clevises 22 securing the spoons 12, 14 and 16 to the leader 18 are separated from the beads 20 by glass bearings 24. However, in the event that glass beads 20 are used, such glass beads may also serve as bearings at the appropriate points along the leader 18. These various components may be separated and space along the leader 18 by means of sleeves 26 which are crimped or swaged to deform into the individual strands 28 of the leader cable 18, to provide a secure means of attachment and spacing of components to the leader 18. Sleeves 26 are also used to secure portions of the cable leader 18 back onto itself, to form loops or eyes 30 for the attachment of hooks, weights, fishing line, etc. by means of swivel snap hooks 32, and intermediate swivels 34, as desired.

As noted above, leader 18 is preferably formed of a multiple strand cable, in order to provide greater flexibility. FIG. 3 shows a cross section of the preferred cable leader 18, formed of seven cords of three strands 28 each, or twenty one strands. Leader 18 is preferably on the order of 1/16th inch diameter stainless steel cable, but alternative types of cable or wire may also be used as desired, depending upon the size of the fish being sought and other factors.

FIG. 2 provides a perspective view of a spoon or spinner 36. Spoon or spinner 36 will be seen to have a generally ellipsoid shape, with a hole 38 near one end providing for attachment to a clevis 22. Preferably, spoon or spinner 36 is formed of aluminum, which provides at least two advantages over more dense metals: First, aluminum is lighter, which means that the spinning and fluttering action provided by a spoon formed of such material will occur at slower trolling speeds than with spoons formed of more dense materials, and/or spoons 36 may be made in a larger size. Secondly, aluminum is relatively soft and porous, and is prone to corrosive effects which serve to increase the microporosity of the surface material and provide a relatively dull, non-reflective surface.

Such a dull, porous surface provides two additional benefits: First, a relatively non-reflective surface is more realistic, as fish are not highly reflective, and secondly, the porosity of the surface provides better retention of a fish attracting scent. The pores 40 of the surface of the spoon or spinner 36 may be achieved by means of corrosive effects, as noted above, or may comprise small depressions mechanically induced by abrasion (e.g., sanding) or by means of knurled areas 42. The force developed during the knurling process may also be used to simultaneously provide the longitudinal bend 44 in the spoon 36, with the first side 48 and opposite second side 50 of the spinner 36 each being flat and non-coplanar with one another in order to provide better spinning action while trolling. The pores 40 or knurled areas 42 provide small depressions which serve to retain small pockets of fish attractant scent 46, as shown in the cross section of FIG. 4. It will be understood that the spoon or spinner 36 of FIGS. 2 and 4 is identical in construction to the spoons or spinners 12, 14, and 16 shown in FIG. 1, the only difference being One of size or scale. FIG. 1 shows a small spinner 16, a medium size spinner 12, and a large spinner 14 installed thereon. This is but one of numerous possible combinations, in which different size spinners or spinners of equal size may be used.

Trolling lure 10 is used by trolling or otherwise moving the lure through the water, to impart a spinning or fluttering action to the spinners 12, 14, and/or 16. One or more spinners may be secured along the leader 18, and when more than one is used, they may each be of the same size, or may be of small, medium, and/or large sizes, as in the case of the respective spinners 16, 12, and 14 of FIG. 1. The relatively dull and non-reflective surface of the spinners 12, 14, and/or 16, provides a realistic appearance of a small group or school of small fish turning and darting near the surface of the water.

Realism is further provided by the relative flexibility of the relatively thin, multiple strand cable leader 18, which allows the spinners or spoons 12, 14 and 16 to move laterally to a certain extent as they are drawn through the water. The porous surface of the spoons or spinners 12, 14, and 16 provides means to better retain pockets of fish attracting scent 46, and prevent the rapid washing away or dispersion of such scent 46. The relatively light weight of the spoons or spinners 36 enables the lure 10 to be trolled or moved through the water at relatively slower speeds, for even greater realism and increases the likelihood of a larger fish investigating and striking the lure 10. The preferably multi-colored glass or plastic beads 20 interspersed along the length of cable leader 18 also serve to attract fish, which are known to be generally attracted to such colorful objects. The beads 20 serve to simulate insects or fish eggs, and the general appearance of the lure 10 of the present invention is of a small school of smaller fish (represented by the spoons or spinners 12, 14 and 16) which are feeding upon insects or fish eggs (represented by the beads 20). The resulting appearance serves to efficiently attract larger fish, particularly when used with a fish attracting scent.

It is to be understood that the present invention is not limited to the sole embodiment described above, but encompasses any and all embodiments within the scope of the following claims.

I claim:

1. A trolling lure comprising:
   a flexible cable leader;
   a plurality of spinner elements attached to said leader by clevises, with said clevises spaced apart therealong by swaged sleeves installed along said leader;
   each of said spinner elements having a dull and generally non-reflective surface;
   said leader further including a plurality of beads strung therealong in groups separating each of said spinner elements;
   said clevises attaching said spinner elements to said leader being separated from said groups of said beads by bearings,
   wherein each of said spinner elements includes a longitudinal bend having a first side and an opposite second side extending therefrom, each of said first side and said opposite second side having a flat surface and said first side is non-coplanar with said opposite second side, whereby;
   said trolling lure is moved through the water and said spinner elements and said beads serve to resemble fish feeding, and thereby serve to attract fish to said trolling lure.

2. The trolling lure of claim 1 wherein:
said flexible cable leader is formed of multiple strands of stainless steel.

3. The trolling lure of claim 1 wherein:
said spinner elements are formed of aluminum.

4. The trolling lure of claim 1 wherein:
said dull and generally non-reflective surface of each of said spinner elements is provided by means of surface porosity.

5. The trolling lure of claim 4 wherein:
said surface porosity comprises a plurality of micropores, with said micropores providing means for the retention of a fish attractant scent therein.

6. The trolling lure of claim 1 wherein:
said dull and generally non-reflective surface of each of said spinner elements is provided by means of abraded depressions formed by surface abrasion.

7. The trolling lure of claim 6 wherein:
said abraded depressions provide means for the retention of a fish attractant scent therein.

8. The trolling lure of claim 1 wherein:
said dull and Generally non-reflective surface of each of said spinner elements is provided by means of knurled depressions formed by surface knurling over at least a portion of said surface.

9. The trolling lure of claim 8 wherein:
said knurled depressions provide means for the retention of a fish attractant scent therein.

10. The trolling lure of claim 1 wherein:
said plurality of spinner elements comprise spinner elements of equal size to one another.

11. The trolling lure of claim 1 wherein:
said plurality of spinner elements comprise at least one small spinner element, at least one medium size spinner element, and at least one large spinner element.

12. The trolling lure of claim 1 wherein:
said each of said spinner elements has an ellipsoid shape.

13. The trolling lure of claim 1 wherein:
said beads are formed of plastic.

14. The trolling lure of claim 1 wherein:
said beads are colored in a variety of colors.

15. The trolling lure of claim 1 wherein:
said beads are reflective.

16. The trolling lure of claim 1 wherein:
said beads are formed of glass and at least some of said beads serve as bearings between said clevises and said swaged sleeves on said leader.

* * * * *